Sept. 8, 1925.  G. A. CAMPBELL  1,552,465
MEANS AND METHOD FOR MEASURING DIRECT CAPACITIES
Filed July 14, 1923  2 Sheets-Sheet 1
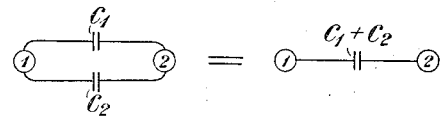
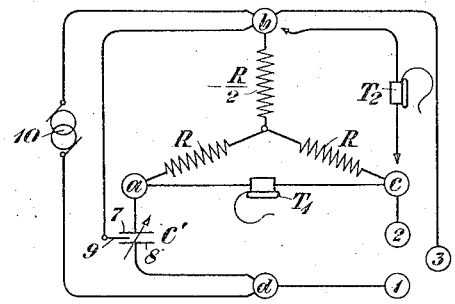
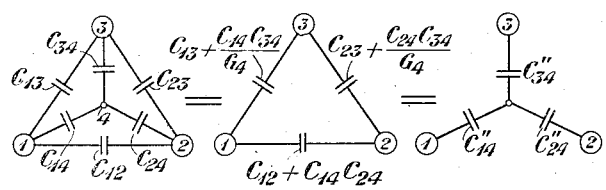
Fig. 1
Fig. 2
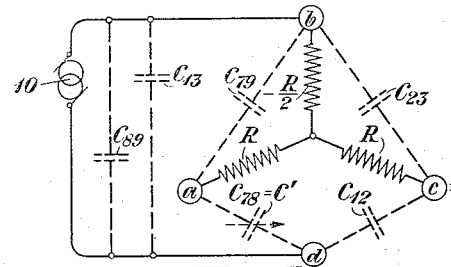
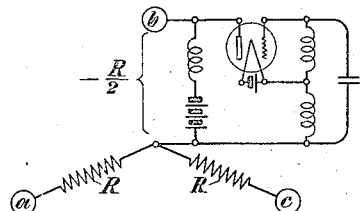
Fig. 3
Fig. 4
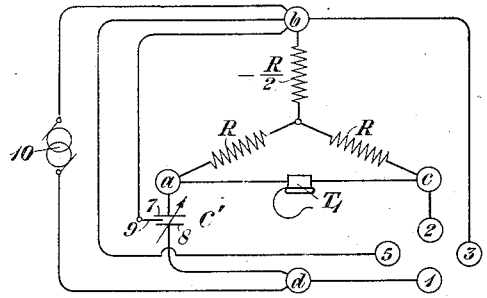
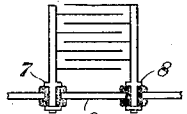
Fig. 6
Fig. 5
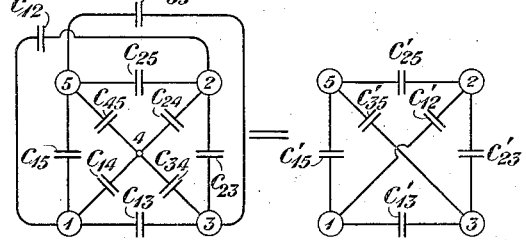
Fig. 7
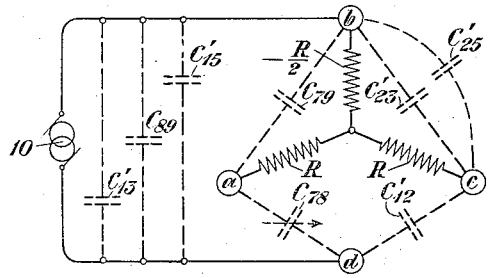
Fig. 8
INVENTOR
G. A. Campbell
BY
ATTORNEY Sept. 8, 1925.  1,552,465
G. A. CAMPBELL
MEANS AND METHOD FOR MEASURING DIRECT CAPACITIES
Filed July 14, 1923   2 Sheets-Sheet 2

INVENTOR
G. A. Campbell
BY
ATTORNEY

Patented Sept. 8, 1925.

1,552,465

UNITED STATES PATENT OFFICE.

GEORGE A. CAMPBELL, OF UPPER MONTCLAIR, NEW JERSEY, ASSIGNOR TO AMERICAN TELEPHONE AND TELEGRAPH COMPANY, A CORPORATION OF NEW YORK.

MEANS AND METHOD FOR MEASURING DIRECT CAPACITIES.

Application filed July 14, 1923. Serial No. 651,587.

*To all whom it may concern:*

Be it known that I, GEORGE A. CAMPBELL, residing at Upper Montclair, in the county of Essex and State of New Jersey, have invented certain Improvements in Means and Methods for Measuring Direct Capacities, of which the following is a specification.

This invention relates to the measurement of capacity and particularly to means and methods for the measurement of direct capacities.

Formerly it was the practice among telephone engineers to make so-called "mutual capacity" measurements between the conductors comprising one or more telephone circuits. Mutual capacity measurements, however, are of little value in connection with cross-talk determinations and consequently it has been more recently the practice to measure the so-called "direct capacity" thereby permitting accurate control of cross-talk and determining more completely how telephone circuits behave under all possible connections. By the direct capacities of an electrical system, is meant the capacities of a particular direct network which is equivalent to the given electrical system as will be more specifically set forth hereinafter.

Telephone cables and other parts of the telephone plant present the problem of measuring capacities which are quite impossible to isolate but which must be measured just as they occur in association with other capacities; and these associated capacities may be much larger than the particular direct capacity which is necessary to accurately measure, and have admittances overwhelmingly larger than the direct conductance which is often the most important quantity. This renders it desirable to measure direct capacities as distinguished from ordinary capacity measurements where isolation of the capacity is secured or at least assumed.

Various methods and arrangements for making direct capacity measurements have been proposed, of which the one in most common use is what is known as the substitution alternating-current bridge method. This method, however, involves two settings of the bridge for each individual direct capacity measurement, as the capacity to be measured must first be connected across one arm of the bridge and the bridge then balanced after which the capacity is connected across another arm of the bridge and a balance again obtained. The actual capacity is determined by combining the results of the two settings. It is one of the objects of the present invention to devise methods and apparatus whereby the measurement of a given direct capacity may be made from a single setting of the bridge.

The invention may now be more fully understood from the following description thereof when read in connection with the accompanying drawing in which:

Figure 1 illustrates how simple fundamental capacity systems may be resolved into equivalent direct capacity networks.

Fig. 2 illustrates one circuit arrangement for measuring direct capacities in accordance with the present invention.

Fig. 3 is a simplified diagram showing the distribution of the capacities in the circuit of Fig. 2.

Fig. 4 is a simplified diagram showing how the negative resistance of the Y network of Fig. 2 may be obtained by using a vacuum tube.

Fig. 5 illustrates schematically a form of shielded condenser which may be used in connection with the circuit of the present invention.

Fig. 6 is a circuit arrangement illustrating how the method may be applied to the measurement of the direct capacity between two terminals of a network involving more than three terminals.

Fig. 7 illustrates how a complex network involving more than three external terminals may be resolved into an equivalent direct network.

Fig. 8 is a simplified diagram showing the distribution of capacities in the circuit arrangement of Fig. 6.

Figure 9:
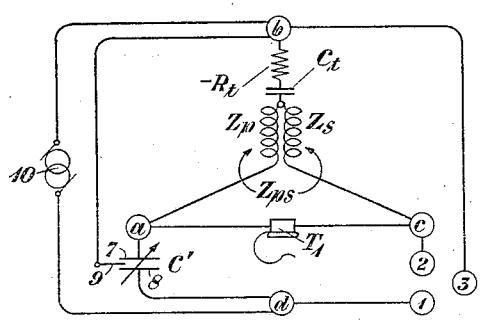
Fig. 9 is a circuit arrangement illustrating another form in which the invention may be applied.

Before proceeding with the description of the invention it is desirable that a few fundamental principles relating to direct capacities be understood. It is a familiar fact that two condensers of capacities $C_1$ and $C_2$, when in parallel or in series, are equivalent to a single capacity $(C_1+C_2)$ or $C_1 C_2/(C_1+C_2)$, respectively, directly connecting the two terminals. These equivalent capacities it is proposed to call direct capacities. The rules for determining them may be stated in a form having general applicability, as follows:

Rule 1. The direct capacity which is equivalent to capacities in parallel is equal to their sum.

Rule 2. The direct capacity between two terminals, which is equivalent to two capacities connecting these terminals to a concealed branch-point, is equal to the product of the two capacities divided by the total capacity terminating at the concealed branch-point, i. e., its grounded capacity.

These rules may be used to determine the direct capacities of any network of condensers, with any number of accessible terminals and any number of concealed branch-points. Thus, all concealed branch-points may be initially considered to be accessible, and they are then eliminated one after another by applying these two rules; the final result is independent of the order in which the points are taken; a network of capacities, directly connecting the accessible terminals, without concealed branch-points or capacities in parallel, is the final result.

Fig. 1 shows two elementary cases of direct capacities and also is an illustration of a more complicated system of capacities with three terminals 1, 2 and 3 assumed to be accessible and the fourth terminal inaccessible or concealed. Thus we see that the direct capacity between the terminals 1 and 2, of the direct network shown at the lower central part of the figure, and which is equivalent to the more complicated network of capacities shown at the left, has a value $$C_{12}+\frac{C_{14}C_{24}}{G_4}$$

where $G_4$, the grounded capacity of the terminal 4, equals $C_{14}+C_{24}+C_{34}$.

Generalizing, we have the following definition:

The direct capacities of an electrical system with $n$ given accessible terminals are defined as the $n(n-1)/2$ capacities which, connected between each pair of terminals, will be the exact equivalent of the system in its external reaction upon any other electrical system with which it is associated only by conductive connections through the accessible terminals.

This definition of direct capacity presents a complete set of direct capacities as constituting an exact symmetrical realizable physical substitute for the given electrical system for all purposes. The following statements of the additive property of direct capacities show the simple manner in which direct capacities are altered under some of the most important external operations which can be made with an electrical network: Connecting a capacity between two terminals adds that capacity to the direct capacity between these terminals, and leaves all other direct capacities unchanged. Connecting the terminals of two distinct electrical systems, in pairs, gives a system in which each direct capacity is the sum of the corresponding two direct capacities in the individual systems. Joining two terminals of a single electrical system to form a single terminal adds together the two direct capacities from the two merged terminals to any third terminal, and leaves all other direct capacities unchanged, with the exception of the direct capacity between the two merged terminals, which becomes a short circuit. Combining the terminals into any number of merged groups leaves the total direct capacity between any pair of groups unchanged, and short-circuits all direct capacities within each group.

With this understanding of the properties of direct capacities in mind, the present invention will now be explained in detail.

Referring to Fig. 2 which shows an arrangement for determining direct capacities by a single bridge setting, it will be observed that instead of the usual form of Wheatstone bridge balance a Y network is connected to three corners $a$, $b$ and $c$ of a bridge. The Y network is made up of two resistances R, R and a negative resistance $-\frac{1}{2}R$. The Y network has a null-impedance between the corner $b$ and the corners $a$ and $c$ connected together. This will be apparent from the fact that the resistance of the two lower arms in parallel is $\frac{1}{2}R$ which, taken in series with the negative resistance of the upper arm, gives a zero resistance for the network. The total conductance connecting the branch-point of the Y to the three bridge corners $a$, $b$ and $c$, is 0. The conductance between any one corner and the remaining two corners joined together, is infinite or in other words, the Y acts as a short circuit under all these conditions. On the other hand, if corner $a$, $b$ or $c$ is left floating and ignored the conductance between the other two corners is 2/R, 1/2R or 2/R, respectively, and the Y is not a short circuit. These statements are verified at once by applying the familiar expressions for resistances in parallel and in series.

The three terminals 1, 2 and 3 of the network whose capacity is to be measured are connected to corners $d$, $c$ and $b$, respectively, of the balance as indicated in Fig. 2. The direct capacity $C_{12}$ between terminals 1 and 2 is the direct capacity to be measured. In order to balance the bridge an adjustable capacity $C'$ is connected between corners $a$ and $d$. This capacity may be of any known adjustable type, but as it is undesirable that there should be any leakage between the main terminals 7 and 8 of the capacity $C'$, a leakage terminal 9 is provided, this leakage terminal being connected to the corner $b$ of the bridge. As an example of how the leakage terminal may be associated with the condenser, a form of construction is illustrated in Fig. 5. Here the base plate 9, supporting the leaves of the condenser, constitutes the leakage terminal. The plates of the condenser are associated with terminals 7 and 8 which are insulated from the leakage terminal 9 in a well known manner. By this construction leakages either over or through the dielectric supports from either of the two main terminals 7 and 8 must pass to the leakage terminal 9. There can be no leakage directly from one of the main terminals through the support to the other. Consequently, there is no phase angle defect in the standard capacity due to leakage and that due to dielectric hysteresis in the insulating material is reduced to a negligible amount by extending the leakage plates beyond the dielectric so as to intersect practically all lines of inductance passing through any support.

While various known forms of negative resistance are available for the negative resistance leg of the Y, it is apparent that an electron tube provided with a feed-back connection may be used for this purpose with considerable advantage. The connections for the electron tube are illustrated in Fig. 4. It is well known that an electron tube provided with a feed-back circuit of this type may be given a definite negative resistance characteristic at a given frequency and as the current supplied to the bridge from the source 10 is an alternating current of a definite frequency, it is evident that the negative resistance characteristic is readily controllable. Correct adjustment of the negative resistance may be checked by observing whether there is silence in a telephone $T_2$ after the bridge has been balanced with respect to the telephone $T_1$. It is, of course, obvious that the telephone $T_1$ is connected across neutral points of the bridge when the bridge is balanced. If the negative resistance has the right value, corners $a$, $b$ and $c$ will all three be at the same potential so that there should also be silence in the telephone $T_2$ which is connected between points $b$ and $c$. Where the negative resistance used is one of a type which maintains its characteristic constant, the test involving the telephone $T_2$ need be made only when the bridge is set up or there is a change in frequency.

In order to clearly understand the operation of the bridge, the distribution of the capacities is illustrated in simplified form in Fig. 3. The direct capacity between points 1 and 2 is the direct capacity to be measured and it will be observed that this capacity which is designated $C_{12}$ is connected between corners $c$ and $d$ of the bridge. The direct capacity $C_{23}$ between terminals 2 and 3 of the network is connected between corners $b$ and $c$ and as these corners are at the same potential, it is apparent that this direct capacity will not enter into the balance obtained by adjusting the condenser $C'$. The third direct capacity $C_{13}$ is connected between corners $b$ and $d$ and consequently is in effect shunted across the high frequency source. It does not, therefore, enter into the balance. Consequently, when the condenser $C'$ is adjusted until the telephone $T_1$ is silent, the setting of the condenser will give the direct capacity $C_{12}$. With regard to the leakage terminal of the adjustable capacity $C'$, it should be noted that the leakage capacity $C_{79}$ between terminals 7 and 9 is connected to corners $a$ and $b$ of the bridge and as these two corners are at the same potential, this leakage does not enter into the balance. So also the leakage capacity $C_{89}$ between terminals 8 and 9 of the condenser $C'$ is connected between corners $b$ and $d$ of the bridge and in effect shunted across the source so that this capacity likewise does not affect the balance. Consequently, the direct capacity $C_{12}$ which is to be measured, is balanced directly by the capacity $C_{78}$ between the main terminals of the adjustable condenser $C'$ and the capacity to be measured may therefore be read directly from the setting of the balancing condenser.

On account of the usual behavior of the Y network even when taken alone, it may not immediately be apparent how it will affect the operation of the bridge of Fig. 2 to connect direct capacities between the corners $a$, $b$ and $b$, $c$. For this reason it is highly desirable to find an equivalent network, the behavior of which is more readily comprehended. For this purpose we may make use of a Y network which is equivalent to the original Y and the direct capacities $C_{ab}$ and $C_{bc}$ taken together, these capacities being, in the case actually illustrated in Fig. 3, capacities $C_{79}$ and $C_{23}$, respectively.

It is well known that any admittance delta may be replaced by a star having admittances equal to the sum of the products of the delta admittances taken in pairs divided by the opposite delta admittance. Let us consider, for example, the delta arrangement shown at the lower left in Fig. 1, which is made up of a Y comprising capacities $C_{14}$, $C_{24}$ and $C_{34}$ connecting external terminals 1, 2 and 3 with capacities $C_{13}$, $C_{23}$ and $C_{12}$ directly connecting the terminals. As already pointed out, this network is equivalent to the simpler direct capacity delta arrangement having the direct capacities $$C_{13}+\frac{C_{14}C_{34}}{G_4}$$

$$C_{23}+\frac{C_{24}C_{34}}{G_4}$$

and $$C_{12}+\frac{C_{14}C_{24}}{G_4}$$

connecting the terminals 1, 2 and 3 as shown at the lower central part of Fig. 1. In the above expressions $G_4 = C_{14}+C_{24}+C_{34}$.

A star arrangement equivalent to this delta is shown at the lower right in Fig. 1 as being made up of the three legs $C_{14}''$, $C_{24}''$, and $C_{34}''$. The values of these capacities may be obtained from the rule already given that the admittance of each element of the equivalent star is equal to the sum of the products of the delta admittances taken in pairs divided by the opposite delta admittance. For example, the element $C_{14}''$ of the star is given in terms of the elements of the delta by the following equation:

$$C''_{14}=\frac{\left(C_{13}+\frac{C_{14}C_{34}}{G_4}\right)\left(C_{23}+\frac{C_{24}C_{34}}{G_4}\right)+\left(C_{23}+\frac{C_{24}C_{34}}{G_4}\right)\left(C_{12}+\frac{C_{14}C_{24}}{G_4}\right)}{C_{23}+\frac{C_{24}C_{34}}{G_4}}+\frac{\left(C_{12}+\frac{C_{14}C_{24}}{G_4}\right)\left(C_{13}+\frac{C_{14}C_{34}}{G_4}\right)}{C_{23}+\frac{C_{24}C_{34}}{G_4}} \quad (1)$$

which reduces to $$C''_{14}=\frac{C_{14}C_{24}C_{34}+C_{14}C_{24}(C_{13}+C_{23})+C_{24}C_{34}(C_{12}+C_{13})+C_{34}C_{14}(C_{12}+C_{23})}{C_{24}C_{34}+G_4C_{23}}$$
$$+\frac{G_4(C_{12}C_{23}+C_{23}C_{13}+C_{12}C_{13})}{C_{24}C_{34}+G_4C_{23}} \quad (2)$$

In a similar manner, the values of the other elements of the star may be derived so that the three legs of the star may be expressed as follows:

$$\left.\begin{array}{l}C''_{14}=\dfrac{S}{C_{24}C_{34}+G_4C_{23}}\\[4pt] C''_{24}=\dfrac{S}{C_{34}C_{14}+G_4C_{13}}\\[4pt] C''_{34}=\dfrac{S}{C_{14}C_{24}+G_4C_{12}}\end{array}\right\} \quad (3)$$

where $$S = C_{14}C_{24}C_{34}+C_{14}C_{24}(C_{13}+C_{23})+C_{24}C_{34}(C_{12}+C_{13})+$$
$$C_{34}C_{14}(C_{12}+C_{23})+G_4(C_{12}C_{23}+C_{23}C_{13}+C_{12}C_{13}) \quad (4)$$

By substituting the value of $G_4$ in the preceding equation, it will be observed that it is the sum of sixteen terms, each of which is the product of three capacities, every combination of three capacities being included, except the four cases in which the three capacities would form a closed circuit. While the preceding formulæ are derived upon the bases of treating the elements of the several networks as simple capacities, it is obvious that the same form of expression will hold for more complex quantities than capacities by simply substituting the complex expression for the various capacity terms. Viewed in this light the formulæ apply to any admittances, either capacities, conductances, or combinations of the two.

As already stated, the total conductance connecting the concealed branch-point of the Y network in Fig. 2 is 0. Assuming that the same thing holds for the delta network shown at the lower left in Fig. 1, the sum of the capacities connected to the point 4 will be 0 so that the factor $G_4$ in equations 3 and 4 become 0, hence for this special case we may obtain from formulæ 3, the following:

$$\frac{C''_{14}}{C_{14}}=\frac{C''_{24}}{C_{24}}=\frac{C''_{34}}{C_{34}}=\frac{S}{C_{14}C_{24}C_{34}} \quad (5)$$

From equation 5, it is seen at once that the arms of the star or Y shown at the lower right in Fig. 1, present the same ratios as the arms of the Y of the equivalent network to the extreme lower left in Fig. 1. It follows, therefore, that the direct capacities $C_{ab}$, $C_{bc}$ of Fig. 3 have no effect on the bridge ratio, thus the constancy of the bridge ratio holds for all null-impedance bridges regardless of the ratio of the arms of the bridge and of the nature of the direct admittance from corners $a$ and $c$ to $b$. In short, the bridge may be given any ratio $Z_1/Z_2$ by employing a Y network made up of impedances $Z_1$, $Z_2$ and $-Z_1Z_2/(Z_1+Z_2)$.

If $G_4=0$ and also $C_{24}=C_{14}$ and $C_{12}=0$ in the network at the lower left of Fig. 1, equation 4 may be written:

$$\frac{S}{C_{14}C_{24}C_{34}}=\frac{C_{14}C_{14}C_{34}+C_{14}C_{14}(C_{13}+C_{23})+C_{14}C_{34}C_{13}+C_{34}C_{14}C_{23}}{C_{14}C_{14}C_{34}}=1+\frac{C_{13}+C_{23}}{C_{34}}+\frac{C_{13}}{C_{14}}+\frac{C_{23}}{C_{14}} \quad (6)$$

also since $$G_4=C_{14}+C_{24}+C_{34}=0 \quad (7)$$

we have $$C_{34}=-(C_{14}+C_{24})=-2C_{14} \quad (8)$$

By substituting the values given by the equations 6 and 8 in equation 5 we have $$\frac{C''_{14}}{C_{14}}=\frac{C''_{24}}{C_{14}}=\frac{C''_{34}}{-2C_{14}}=1+\frac{C_{13}+C_{23}}{-2C_{14}}+\frac{C_{13}+C_{23}}{C_{14}} \quad (9)$$

consequently $$C''_{14}=C''_{24}=-\frac{1}{2}C''_{34}=C_{14}+\frac{1}{2}(C_{13}+C_{23}) \quad (10)$$

Applying this to the circuit of Fig. 3 which is possible since the bridge ratio is unity, we find that the three arms of the equivalent Y may be considered as being made up of resistances and capacities in parallel. The resistance are R, R and $-\frac{1}{2}R$, and the associated capacities are C, C, and $-2C$, where R is the original resistance in the Y and C is one-half the sum of the two actual direct capacities from $b$ to $a$ and $b$ to $c$. The equivalent bridge thus obtained has ratio arms made up of ordinary resistances and capacities and therefore Fig. 4 used as a bridge can present no unexpected characteristics. The negative resistances and capacities of the equivalent Y merely affect the current supplied to the bridge.

Fig. 6 shows how a bridge having a Y network of the type shown in Fig. 2 may be used to obtain the direct capacity between two conductors of a larger group than three. In this case, a group of four conductors is assumed, numbered 1, 2, 3 and 5, conductor 1 being connected to corner $d$, conductor 2 to corner $c$, conductor 3 to corner $b$ and conductor 5 to corner $b$.

The capacities between each of the four terminals 1, 2, 3 and 5 taken in pairs and the capacities between each of the four terminals and the ground point 4, are shown at the left of Fig. 7. By applying the principle set forth in connection with the discussion of Fig. 1, the complex network at the left of Fig. 7 may be replaced by a simple direct network of six direct capacities as indicated at the right of Fig. 7.

Referring now to Fig. 8, which shows the distribution of the equivalent direct capacities with reference to the bridge of Fig. 7, it will be seen that the direct capacities $C'_{23}$ and $C'_{25}$ are connected in parallel between corners $b$ and $c$, while direct capacities $C'_{13}$ and $C'_{15}$ are connected between terminals $b$ and $d$, thereby being in effect shunted across the source. Direct capacity $C'_{12}$ which is to be measured is connected between terminals $c$ and $d$ as before. The remaining direct capacity $C'_{35}$ is short-circuited by reason of the fact that conductors 3 and 5 are both connected to terminal $b$, consequently this direct capacity does not enter into the balance. The capacities associated with the balancing condenser $C'$ are distributed in the same manner as in Fig. 3. It will be seen from the diagram of Fig. 8 that when the bridge is balanced the capacity $C'_{12}$ to be measured will be equal to the capacity $C_{78}$ to which the balancing condenser $C'$ is set.

Figure 11:
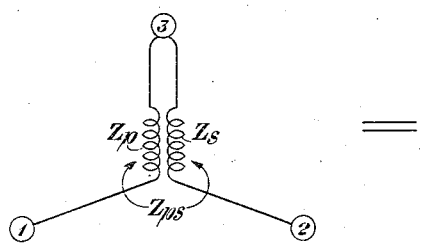

An ideal transformer, if such a device existed, might replace the Y network of Fig. 2, for example, for the transformer would maintain a constant ratio between the currents in the two windings and act as a short-circuit when the bridge is balanced. In a paper by G. A. Campbell entitled "Cisoidal oscillations" appearing in the transactions of the American Institute of Electrical Engineers for 1911 at page 873, it is shown that a given Y network may be replaced by an equivalent transformer. For example, referring to Fig. 11, if we have terminals 1, 2 and 3 connected by a Y network whose arms have admittances $Y_{14}$, $Y_{24}$ and $Y_{34}$, respectively, the network may be replaced by a transformer having a primary impedance $Z_p$, a secondary impedance $Z_s$ and a mutual impedance $Z_{ps}$, as indicated at the left of the figure. (See Figures 2 and 4 of Table I opposite page 884 of the above mentioned paper in the transactions of the American Institute of Electrical Engineers.)

Figure 12:
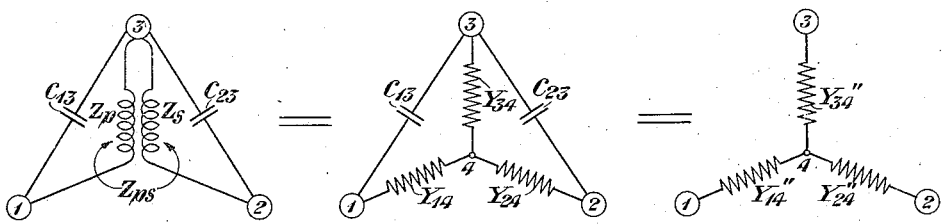

Let us determine the error when an actual transformer with impedances $Z_p$, $Z_s$ and $Z_{ps}$ is employed, and capacities $C_{13}$ and $C_{23}$ connect terminals 1, 3 and 2, 3, respectively, as indicated in Fig. 12. The network comprising the transformer and its associated capacities may be replaced by a Y network associated with similar capacities as shown at the right thereof in Fig. 12. This network in turn may be replaced by an equivalent direct network consisting of a simple Y as shown at the extreme right. The ratio of the two lower arms $Y''_{14}$ and $Y''_{24}$ of the equivalent direct network may be determined from equation 3. By substituting a corresponding admittance term $Y$ for each capacity term $C$ in the first and second formulæ and by substituting $Y_4$ for $G_4$ in said formulæ, the ratio may be then expressed:

$$\frac{Y''_{14}}{Y''_{24}} = \frac{Y_{34}Y_{14} + Y_4 Y_{13}}{Y_{24}Y_{34} + Y_4 Y_{23}} \quad (11)$$

Referring again to the table appearing opposite page 884 of the paper on Cisoidal oscillations above referred to, it will be seen that the admittances of the three arms of a Y network, such as shown at the right of Fig. 12, may be expressed in terms of the primary, secondary and mutual impedances of the equivalent transformer, as follows:

$$\left. \begin{array}{l} Y_{14} = \dfrac{1}{Z_p + Z_{ps}} \\[4pt] Y_{24} = \dfrac{1}{Z_s + Z_{ps}} \\[4pt] Y_{34} = \dfrac{1}{Z_{ps}} \end{array} \right\} \quad (12)$$

Similarly, $Y_4$ which is the algebraic sum of the three legs of the Y joined at point 4, may from equation 12 be expressed as follows:

$$Y_4 = \frac{Z^2_{ps} - Z_p Z_s}{(Z_p + Z_{ps})(Z_s + Z_{ps}) Z_{ps}} \quad (13)$$

Substituting the values given by equations 12 and 13 in equation 11, the actual ratio of the bridge arms at the right of Fig. 12 becomes:

$$\frac{Y''_{14}}{Y''_{24}} = \frac{Z_s + Z_{ps} + (Z_p Z_s - Z^2_{ps}) Y_{13}}{Z_p + Z_{ps} + (Z_p Z_s - Z^2_{ps}) Y_{23}} \quad (14)$$

This equation shows that the ratio is not entirely independent of the admittances of the capacities $C_{13}$ and $C_{23}$ of the transformer network shown at the left in Fig. 12, but by suitable design of the transformer, the factor $Z_p Z_s - Z^2_{ps}$ may be made to approach 0, so that the error introduced by connecting the capacities across the corners, 1, 3 and 2, 3 may be made relatively small. For an ideal transformer, of course, this factor would be 0. The terms which involve this factor in the numerator and denominator of equation 14 may be caused to completely vanish by including in series with the two windings of the transformer a properly adjusted negative resistance. A condenser may also be included to neutralize the reactance. In this manner an ordinary transformer may be made to give the same perfect results as are obtained with the resistances of Fig. 2, for example.

Figure 10:
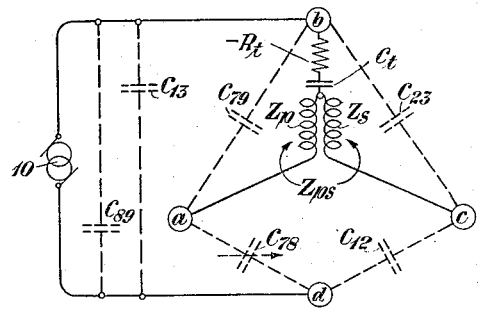
Fig. 10 is a simplified circuit illustrating the capacity distribution in the circuit of Fig. 9, and Figs. 11 and 12 are circuits illustrating the theory underlying the operation of the circuit of Fig. 9.

The manner in which these negative resistances may be connected in a circuit involving a transformer, is illustrated in Fig. 9 in which negative resistance $R_t$ is included in series with the impedances $Z_p$, $Z_s$ of the transformer windings. This negative resistance may be of any known type such, for example, as a negative resistance obtained from a vacuum tube circuit such as illustrated in Fig. 4. The circuit arrangement of Fig. 9 presents the advantage of calling on the vacuum tube for only a relatively small compensating effect, the greater part of the compensation being accomplished by means of the mutual impedance of the transformer. A condenser $C_t$ is shown in series with the negative resistance for neutralizing the reactance of the transformer. The connections of the capacities to be measured and of the balancing capacity in Fig. 9 are the same as in Fig. 2 and the resultant capacity distribution is illustrated in Fig. 10. It will be obvious from Fig. 10 that the capacity $C_{78}$ resulting from the adjustment of the condenser $C'$ directly balances the capacity $C_{12}$ to be measured so that the value of the latter may be obtained directly from the reading of the adjusted condenser $C'$.

It will be obvious that the general principles herein disclosed may be embodied in many other organizations widely different from those illustrated without departing from the spirit of the invention as defined in the following claims.

What is claimed is:

1. A bridge for measuring admittances, said bridge having four accessible terminals, a network connecting three of the terminals, said network being so proportioned and designed that the conductance between any one of the three terminals and the remaining two terminals joined together is infinite, an indicating instrument connected to two of said three terminals, an alternating-current source connected to the remaining terminal of the three and to the fourth terminal of the bridge, an admittance to be measured connected between the fourth terminal of the bridge and one of said three terminals and a standard admittance connected between said fourth terminal and another of said three terminals, said standard admittance being adjustable to balance the admittance to be measured.

2. A bridge for measuring admittances, said bridge having four accessible terminals, a network connecting three of the terminals, said network being so constructed and proportioned as to produce equal potentials at all three of said terminals, an indicating instrument connected to two of said three terminals, an alternating-current source connected to the remaining terminal of the three and to the fourth terminal of the bridge, an admittance to be measured connected between the fourth terminal of the bridge and one of said three terminals and a standard admittance connected between said fourth terminal and another of said three terminals, said standard admittance being adjustable to balance the admittance to be measured.

3. A bridge for measuring direct capacities, said bridge having four accessible terminals, a network connecting three of the terminals, said network so proportioned and designed that the conductance between any one of the three terminals and the remaining two terminals joined together is infinite, an indicating instrument connected to two of said three terminals, an alternating-current source connected to the remaining terminal of the three and to the fourth terminal of the bridge, a plurality of conductors in capacitative relation to each other, two of said conductors between which a direct capacity exists, being connected, the one to said fourth terminal of the bridge and the other to one of said three terminals of the bridge and the remainder of the conductors being connected to another of said three terminals of the bridge whereby the remaining direct capacities of the system are so connected as to not affect the balance of the bridge, a standard condenser connected between said fourth terminal of the bridge and another of said three terminals, said standard condenser being adjustable to balance the direct capacity between said first two conductors.

4. A bridge for measuring direct capacities, said bridge having four accessible terminals, a network connecting three of the terminals, said network being so constructed and proportioned as to produce equal potentials at all three of said terminals, an indicating instrument connected to two of said three terminals, an alternating-current source connected to the remaining terminal of the three and to the fourth terminal of the bridge, a plurality of conductors in capacitative relation to each other, two of said conductors between which a direct capacity exists, being connected, the one to said fourth terminal of the bridge and the other to one of said three terminals of bridge and the remainder of the conductors being connected to another of said three terminals of the bridge whereby the remaining direct capacities of the system are so connected as to not affect the balance of the bridge, a standard condenser connected between said fourth terminal of the bridge and another of said three terminals, said standard condenser being adjustable to balance the direct capacity between said first two conductors.

5. A bridge for measuring admittances, said bridge having four accessible terminals, a Y network interconnecting three of said terminals, said Y network being so designed and proportioned that the total conductance connecting the concealed branch-point of the Y to said three terminals is zero, an alternating current source connected to one of said three terminals and to the fourth terminal of the bridge, an admittance to be measured connecting said fourth terminal and one of the remaining two of said three terminals and a standard admittance connected between said fourth terminal and the third of said three terminals, said standard admittance being adjustable to balance the admittance to be measured.

6. A bridge for measuring admittances, said bridge having four accessible terminals, a Y network interconnecting three of said terminals, said Y network comprising a combination of positive and negative resistances so proportioned that the conductance connecting the concealed branch-point of the Y to the three bridge terminals is zero, an alternating-current source connected to one of said three terminals and to the fourth terminal of the bridge, an admittance to be measured connecting said fourth terminal and one of the remaining two of said three terminals and a standard admittance connected between said fourth terminal and the third of said three terminals, said standard admittance being adjustable to balance the admittance to be measured.

7. A bridge for measuring direct capacities, said bridge having four accessible terminals, a Y network interconnecting three of said terminals, said Y network being so designed and proportioned that the total conductance connecting the concealed branch-point of the Y to said three terminals is zero, an alternating current source connected to one of said three terminals and to the fourth terminal of the bridge, a plurality of conductors arranged in capacitative relation, two of said conductors between which an equivalent direct capacity to be measured exists, being connected, the one to said fourth terminal and the other to one of said three terminals of the bridge, the remaining of the conductors being connected to another of said three terminals so that the remaining equivalent direct capacities are so connected as to not affect the balance of the bridge, a standard capacity connected between said fourth terminal of the bridge and the remaining terminal of said three terminals, said standard capacity being adjustable to balance the direct capacity to be measured.

8. A bridge for measuring direct capacities, said bridge having four accessible terminals, a Y network interconnecting three of said terminals, said Y network comprising a combination of positive and negative resistances so proportioned that the conductance connecting the concealed branch-point of the Y to the three bridge terminals is zero, an alternating-current source connected to one of said three terminals and to the fourth terminal of the bridge, a plurality of conductors arranged in capacitative relation, two of said conductors between which an equivalent direct capacity to be measured exists, being connected, the one to said fourth terminal and the other to one of said three terminals of the bridge, the remainder of the conductors being connected to another of said three terminals so that the remaining equivalent direct capacities are so connected as to not affect the balance of the bridge, a standard capacity connected between said fourth terminal of the bridge and the remaining terminal of said three terminals, said standard capacity being adjustable to balance the direct capacity to be measured.

9. A bridge for measuring direct capacities, said bridge comprising four accessible terminals, a Y network interconnecting three of said terminals, said Y network comprising two equal positive resistance legs, and a third negative resistance leg having a resistance equal in value but opposite in sign to the resistance of the other two legs connected in parallel, an alternating-current source connected between the fourth terminal of said bridge and one of said three terminals, a plurality of conductors arranged in capacitative relation to each other, two of said conductors between which an equivalent direct capacity exists, being connected, the one to said fourth terminal and the other to another of said three terminals, the remainder of the conductors being connected to the first of said three terminals so that the remaining direct capacities of the system do not affect the balance of the bridge and a standard capacity connected between said fourth terminal and the third of said three terminals, said standard capacity being adjustable to balance the direct capacity to be measured.

10. A bridge for measuring direct capacities, said bridge comprising four accessible terminals, a Y network interconnecting three of said terminals, said Y network comprising two equal positive resistance legs, and a third negative resistance leg having a resistance equal in value but opposite in sign to the resistance of the other two legs connected in parallel, an alternating current source connected between the fourth terminal of said bridge and one of said three terminals, a plurality of conductors arranged in capacitative relation to each other, two of said conductors between which an equivalent direct capacity exists, being connected, the one to said fourth terminal and the other to another of said three terminals, the remaining conductor or conductors being connected to the first of said three terminals so that the remaining direct capacities of the system do not affect the balance of the bridge and a standard capacity connected between said fourth terminal and the third of said three terminals, said standard capacity being adjustable to balance the direct capacity to be measured, and having a leakage terminal connected to the first of said three terminals.

11. A bridge for measuring capacities, said bridge having four accessible terminals, a network connecting three of the terminals, said network being so proportioned and designed that the conductors between any one of the three terminals and the remaining two terminals joined together is infinite, an indicating instrument connected to two of said three terminals, an alternating-current source connected to the remaining terminal of the three and to the fourth terminal of the bridge, a capacity to be measured connected between the fourth terminal of the bridge and one of said three terminals and a standard capacity connected between the fourth terminal of the bridge and another of said three terminals, said standard capacity being adjustable to the balance of the capacity to be measured and having a leakage terminal connected to the third of said three terminals.

12. A bridge for measuring capacities, said bridge having four accessible terminals, a network connecting three of the terminals, said network being so constructed and proportioned as to produce equal potentials at all three of said terminals, an indicating instrument connected to two of said three terminals, an alternating-current source connected to the remaining terminal of the three and to the fourth terminal of the bridge, a capacity to be measured connected between the fourth terminal of the bridge and one of said three terminals and a standard capacity connected between the fourth terminal of the bridge and another of said three terminals, said standard capacity being adjustable to the balance of the capacity to be measured and having a leakage terminal connected to the third of said three terminals.

13. In a bridge comprising four accessible terminals, the method of measuring admittances which consists in applying an alternating potential to two of said terminals, producing a condition of equal potential at one of said terminals and the remaining two terminals of the bridge, connecting an indicating instrument between said remaining two terminals, connecting an admittance to be measured between one of the terminals to which said source is applied and one of said remaining two terminals, and adjusting the admittance between said terminal to which the source is applied and the other of said remaining two terminals to produce a balance.

14. In a bridge comprising four accessible terminals, the method of measuring the capacity between two of a group of conductors in capacitative relation which consists in applying a source of alternating potential to two of said terminals, producing a condition of equal potentials at one of said two terminals and at the remaining two terminals of the bridge, connecting an indicating instrument between said remaining two terminals, connecting two of said group of conductors between which the direct capacity to be measured exists, the one to one of said two remaining terminals and the other to one of said first two terminals connecting the remaining conductor or conductors to the other of said first two terminals, and adjusting the capacity between one of the terminals to which said source is applied and the other of said remaining two terminals to balance the direct capacity to be measured.

In testimony whereof, I have signed my name to this specification this 13th day of July 1923.

GEORGE A. CAMPBELL.